United States Patent [19]

Mather et al.

[11] Patent Number: 4,535,868

[45] Date of Patent: Aug. 20, 1985

[54] TRANSVERSE ENGINE MOUNTING

[75] Inventors: Joseph M. Mather, Lisbon; Larry E. Albright, Gwinner, both of N. Dak.

[73] Assignee: Clark Equipment Company, Buchanan, Mich.

[21] Appl. No.: 502,409

[22] Filed: Jun. 8, 1983

[51] Int. Cl.³ .............................................. B62D 11/04
[52] U.S. Cl. ................................... 180/297; 180/6.48; 180/89.1
[58] Field of Search ..................... 180/6.48, 297, 89.1, 180/89.12, 242, 297; 296/187, 193, 196; 414/697, 715

[56] References Cited

U.S. PATENT DOCUMENTS 3,231,117 1/1966 Melroe et al. ..................... 414/715
4,055,262 10/1977 Bauer et al. ......................... 414/697
4,168,757 9/1979 Mather et al. ..................... 180/6.48

Primary Examiner—Richard A. Bertsch
Attorney, Agent, or Firm—Kenneth C. Witt; John C. Wiessler

[57] ABSTRACT

A hydrostatic drive vehicle and a subassembly for such vehicle wherein the subassembly includes an engine and a pump mechanism arranged in a manner such that when the subassembly is assembled into the vehicle the axes of the engine and the pump mechanism are transverse of the longitudinal axis of the vehicle. Other parts such as an alternator, coolant pump, air cooling fan and fan shroud also may be included in the subassembly.

13 Claims, 5 Drawing Figures

TRANSVERSE ENGINE MOUNTING

BACKGROUND OF THE INVENTION

This invention relates to the mounting of engines in vehicles and more particularly to the mounting of engines in skid-steer vehicles.

1. Field of the Invention

Skid-steer loaders are vehicles possessing a high degree of maneuverability and which are propelled and maneuvered by driving the wheels on one side of the vehicle at a different speed and/or in a different direction from those on the other side so as to achieve a turning motion. When the wheels on one side are driven forwardly and those on the opposite side rearwardly, the loader turns on its own vertical axis.

The drive mechanism of hydrostatic drive skid-steer loaders generally comprises an internal combustion engine having its output shaft coupled to a pair of axially aligned variable displacement pumps, the output of each pump directed to a respective one of a pair of motors which operate respective independent chain and sprocket drives on opposite sides of the vehicle. The hydrostatic drive mechanism for skid-steer loaders evolved from a mechanical clutch mechanism driven by the engine wherein a combination of belts and pulleys operatively connected to the chain and sprocket drive of the vehicle permitted the vehicle to operate in the skid-steer mode. Until the present invention, it has been difficult to adapt hydrostatic drive to the smallest of skid-steer vehicles. The present invention represents an improvement over prior hydrostatic drive mechanisms, which permits such adaptation.

2. Description of the Prior Art

A prior art vehicle with mechanical clutch drive is exemplified by U.S. Pat. No. 3,231,117 entitled "Tractor Vehicle and Drive Therefor" by C. E. Melroe et al which issued on Jan. 25, 1966. FIGS. 4, 5 and 6 of the Melroe et al patent disclose a clutch type mechanism wherein a shaft driven by the engine has mounted thereon an adustable sheave which is coupled by a V-belt to a split pulley connected to a jack shaft which is operatively connected through a pair of clutches to a drive chain which is drivingly coupled to primary drive sprockets which drive additional chains connected between the drive sprocket and the wheel sprockets, the wheel sprockets being coupled to respective stub axles of the vehicle. Independently operated clutches are provided on opposite sides of the vehicle and the clutches are manipulated to operate the vehicle in forward and reverse directions.

The current state of the art of a skid-steer loader with hydrostatic drive is exemplified by U.S. Pat. No. 4,055,262 entitled "Loader Main Frame for Skid Steer Loader" by James J. Bauer et al which issued on Aug. 25, 1977 to the assignee of the present invention and U.S. Pat. No. 4,168,757 entitled "Drive System for a Skid Steer Loader" by Joseph M. Mather et al which issued on Sept. 25, 1979 to the assignee of the present invention. FIG. 8 of U.S. Pat. No. 4,055,262 shows a hydrostatic drive wherein an engine 81 is coupled to a hydraulic pump mechanism 85 extending axially from the engine 81. Pump mechanism 85 comprises a pair of axially aligned variable displacement pumps which are connected respectively to motors 86 and 87 mounted on opposite sides of a transmission case for driving respectively independent chain and sprocket drives contained therein.

Vehicles of a similar size to those for which the present invention is primarily intended normally have employed clutch drive mechanisms similar to that of the U.S. Pat. No. 3,231,117. Design considerations have prohibited the incorporation of commonly used prior art hydrostatic drive mechanisms within the smaller vehicle body configurations. Accordingly, the present invention was devised to modify the prior art hydrostatic drives to achieve a new vehicle configuration of improved design. The features of novelty which characterize our invention are pointed out with particularity in the claims which form a part of this specification.

SUMMARY OF THE INVENTION

The present invention provides an improved hydrostatic drive mechanism for skid-steer loaders and other vehicles. The improved drive mechanism includes a subassembly of engine and pumps and other items capable of being assembled before insertion into the vehicle. The subassembly incorporates means for mounting the subassembly on the frame of the vehicle wherein the engine is transversely mounted with respect to the longitudinal axis of the vehicle. The pumps are located with their drive axis parallel to the drive axis of the engine and they are mounted as a part of the subassembly which rigidly fixes the pumps and rigidly fixes the space between the axis of the pumps and the axis of the engine to maintain the belt pulley centers. Respective pulleys mounted on the engine output shaft and the pump input and interconnecting belts cause the engine to drive the pumps. The pumps may be axially aligned and are operatively connected to respective motors provided on opposite sides of the vehicle for connection to respective independent chain and sprocket drives of the vehicle for operation of the vehicle in a manner known in the prior art. This invention allows the vehicle designer readily to select from a multitude of engine speed to pump speed ratios by selecting engine and pump pulleys of suitable sizes.

The subassembly further may include a fan on the coolant pump. This configuration wherein the fan is mounted on a coolant pump whose axis is transverse of the vehicle minimizes the gyroscopic effect caused by pitching of the skid-steer vehicle during operation. Mounting the fan housing near one side of the vehicle also provides easier access to the cooling system. Thus, the present mounting arrangement provides an improved configuration. It provides a subassembly which may be assembled outside the vehicle and then inserted in place. Finally, the combination of engine, pumps and fan housing forms a single mass of increased size which results in lower vibration amplitude and a substantially more stable operation.

DETAILED DESCRIPTION OF THE PREFERRED EMBODIMENT

Figure 1:
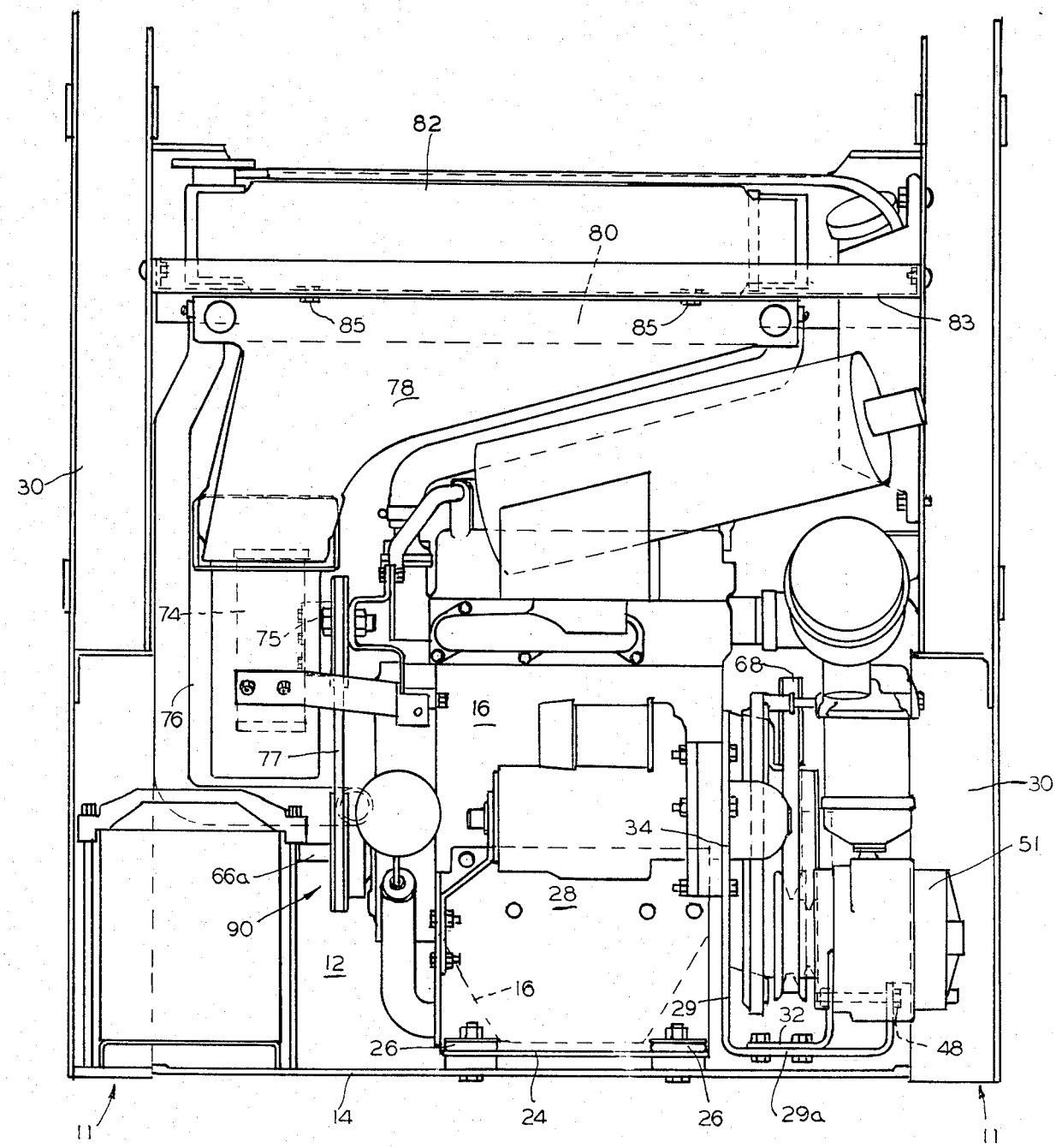
FIG. 1 is a view of the mounting arrangement of the present invention as viewed from the rear of a skid-steer vehicle, with the outline of the frame provided to show the engine space, and with some parts omitted for clarity.
Figure 2:
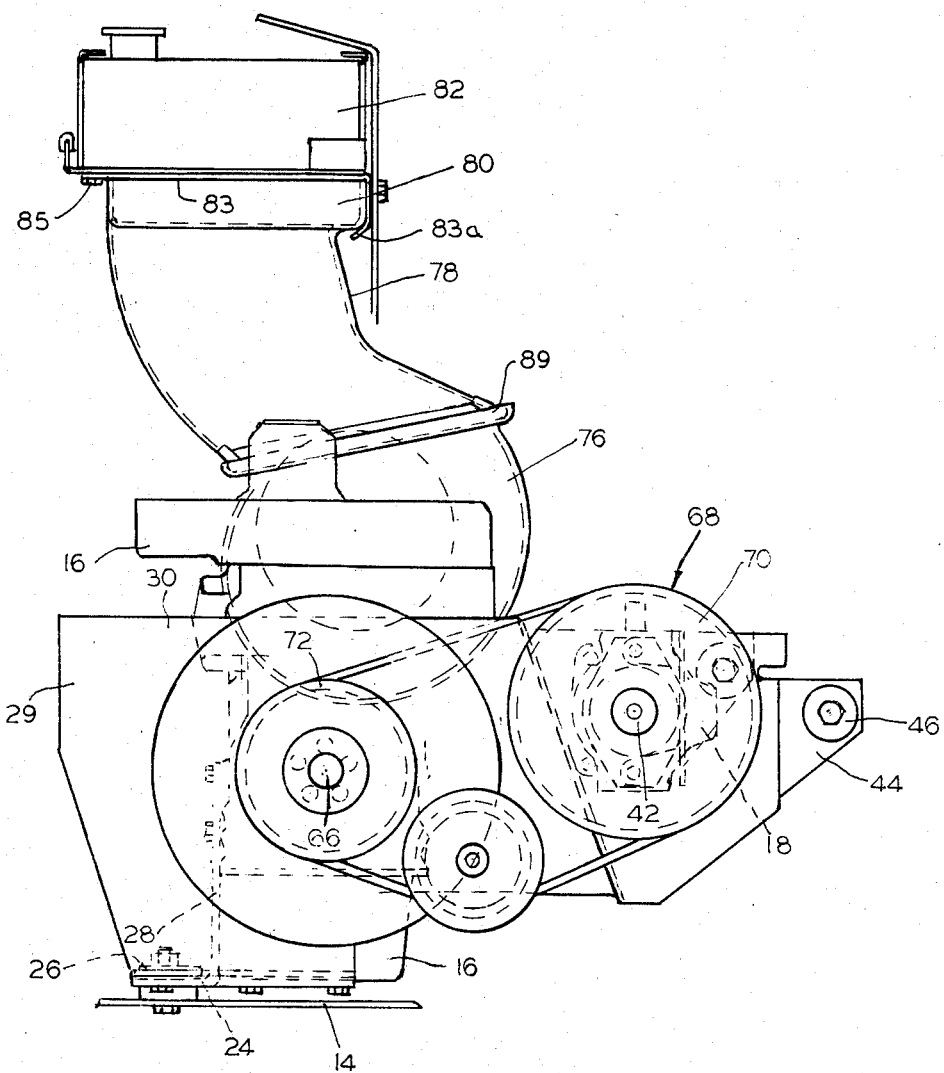
FIG. 2 is a right side elevational view of the mounting arrangement of the present invention with some parts of the vehicle omitted for clarity.

FIGS. 1 and 2 of U.S. Pat. No. 4,055,262 disclose the general body configuration of a skid-steer vehicle wherein there is provided an engine compartment similar to the compartment which houses the engine and pump mounting arrangement of the present invention. To the extent that the description and drawing of U.S. Pat. No. 4,055,262 aids in understanding the general body configuration of a skid-steer loader, FIGS. 1 and 2 of that patent are incorporated herein by reference; specifically, see column 5, lines 5-68 which describe FIGS. 1 and 2 of the aforementioned patent.

Figure 4:
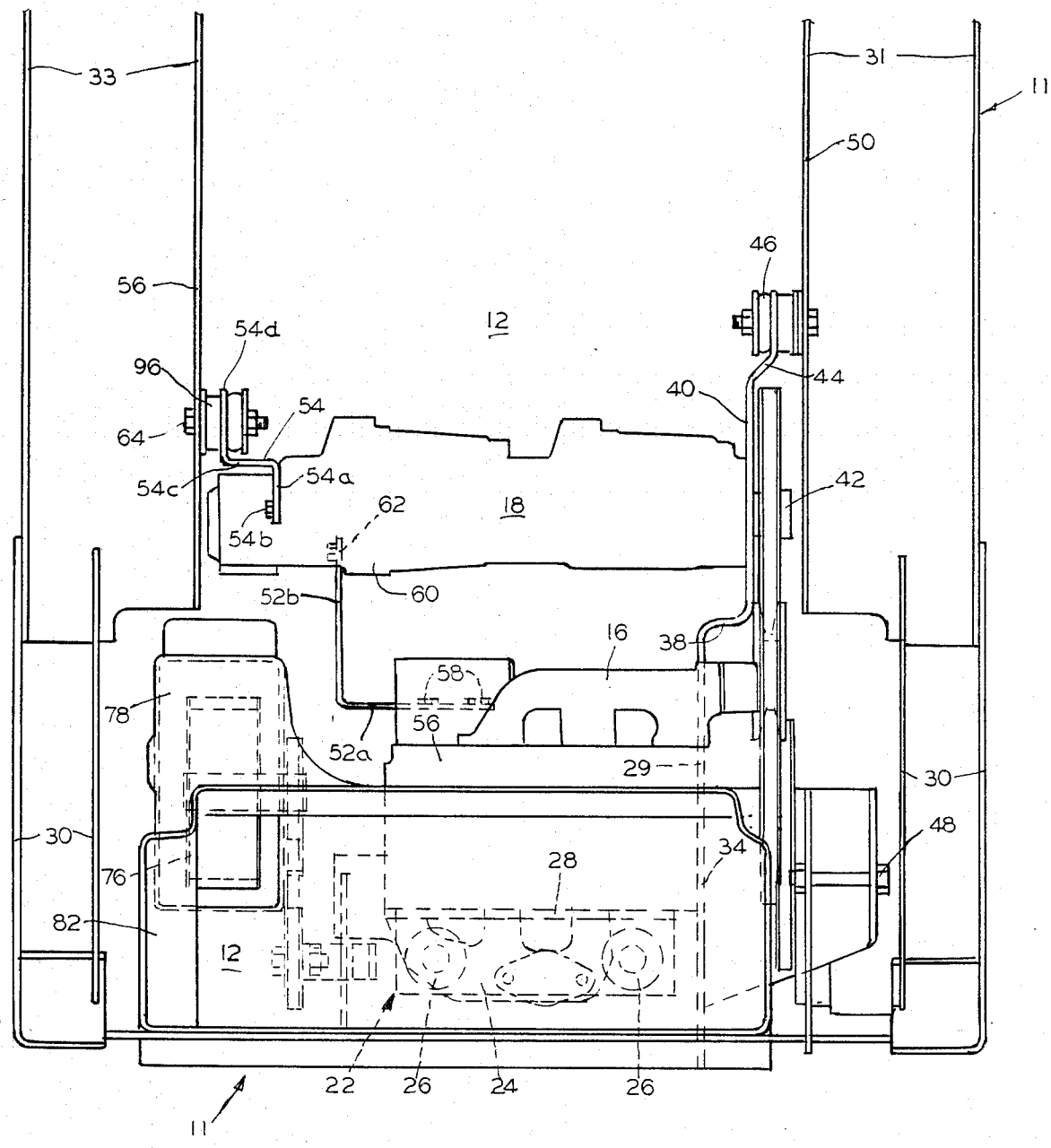
FIG. 4 is a top plan view of the mounting arrangement of the present invention.

Referring to FIGS. 1, 2 and 4 of the attached drawing the vehicle includes a frame structure which is indicated generally by the numeral 11. The frame 11 defines a compartment 12 adjacent the rear of the vehicle which houses a subassembly 90 comprising an engine 16, a pump mechanism 18 and other items. Vertical members 30 on each side at the rear of the vehicle are part of the frame 11 as is cross member 14 at the bottom of the rear of the vehicle. Also at the rear, an L-shaped bracket 22 is connected at its base leg 24 through a pair of vibration dampening connections 26 to the frame cross member 14. The upper leg 28 of the mounting bracket 22 is rigidly secured to a rear portion of the engine 16.

The frame 11 includes a right side member 31 and a left side member 33 as best seen in FIG. 4. A bracket 29 extends longitudinally adjacent right side member 31 and is secured near its front extremity to the right member 31 of frame 11 by means of vibration dampening connection 46; at the other end, the bracket 29 includes a leg portion 29a (see FIG. 1) which leads from the main portion of the bracket 29 to connection 48 between the bracket 29 and an alternator 51 which forms a part of subassembly 90. As seen best in FIG. 4, the bracket 29 includes a rearward flat portion 34, a front flat portion 40 offset at 38 from portion 34 and a forward neck portion 44 which joins portion 40 to connector 46. The right side of engine 16 is rigidly secured to portion 34 and the right side of pump mechanism 18 is rigidly secured to portion 40.

Figure 3:
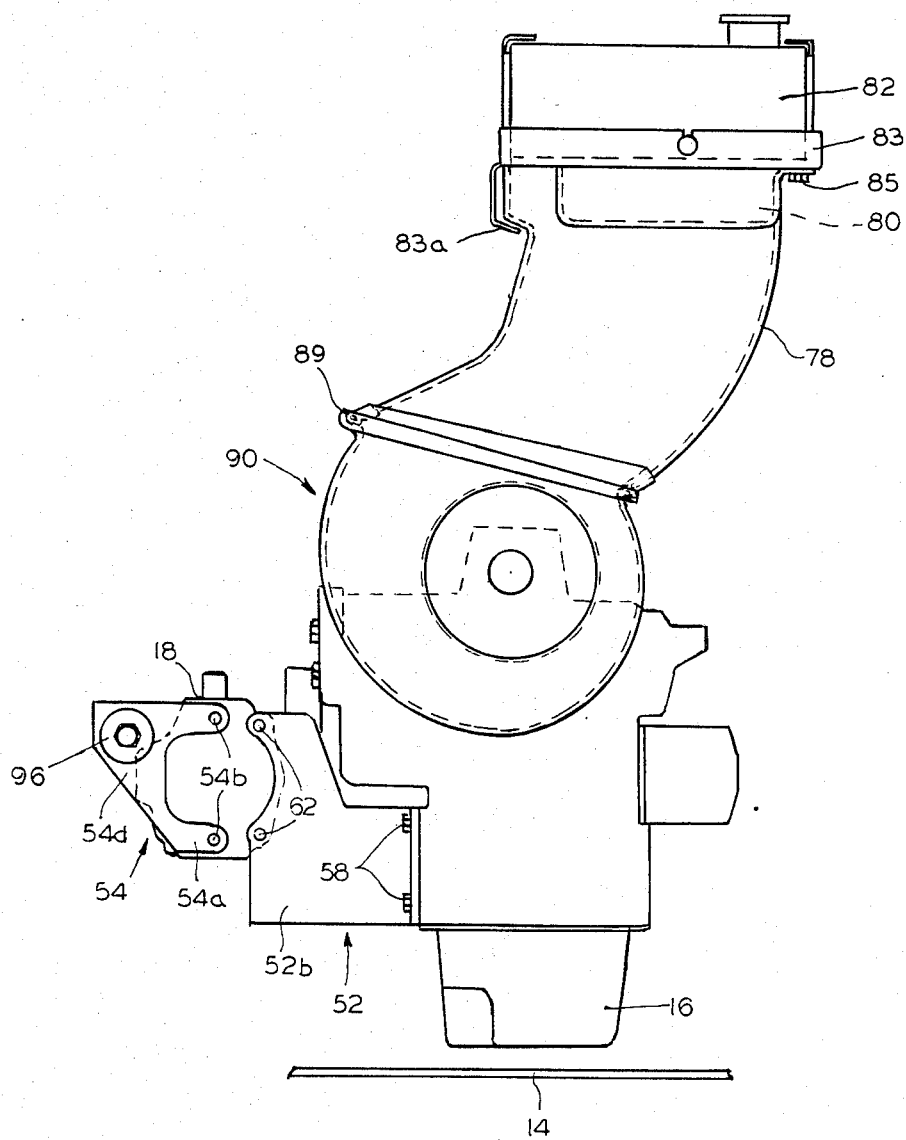
FIG. 3 is a left side elevational view to further define the mounting arrangement of the present invention.

On the side of the subassembly 90 opposite the bracket 29, as seen in FIGS. 3 and 4, a pair of brackets 52 and 54 connect the engine 16 rigidly to the pump mechanism 18 and the pump mechanism to the left frame side 33 respectively. Bracket 52 is a generally L-shaped member having a first leg 52a connected to a portion 56 of the engine 16 as by machine screws 58 and having a perpendicular leg portion 52b connected to portion 60 of the pump mechanism 18 at location 62. The bracket 54 is a Z-shaped bracket having one leg 54a connected rigidly to the pump mechanism as by machine screws 54b. A mid portion 54c is connected to a leg portion 54d which is joined by vibration dampening connection 96 to left frame side member 33.

The bracket 52 provides a rigid connection between the engine and the pump. The engine 16 and the pump mechanism 18 are transversely mounted in the compartment 12 with output shaft 66 of the engine 16 (see FIG. 2) operatively connected to input shaft 42 of the pump mechanism 18 through a belt drive mechanism 68 which includes pulleys 70 and 72 mounted on the respective shafts 42 and 66 as shown in FIG. 2. Pump mechanism 18 preferably includes two axially aligned pumps.

Figure 5:
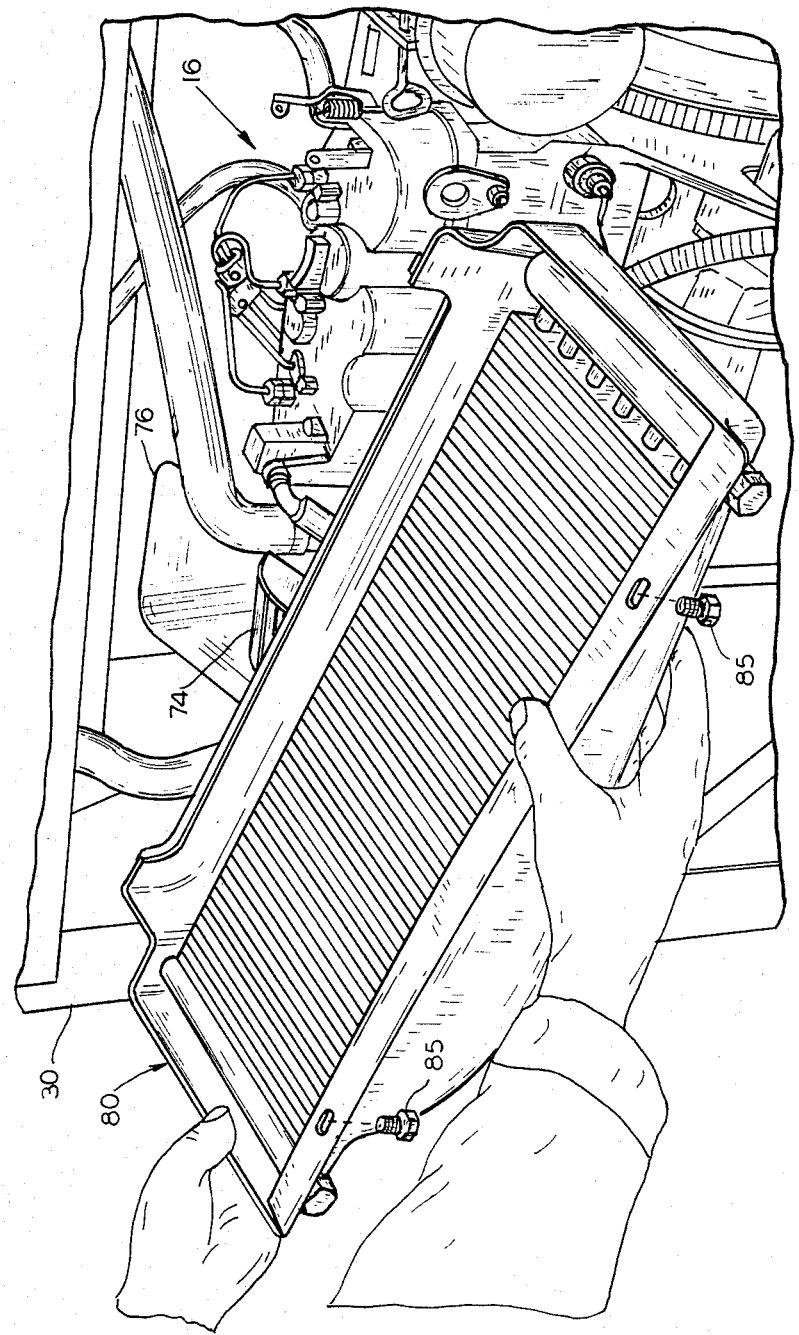
FIG. 5 is a perspective view illustrating the manner in which an oil cooler is assembled in a vehicle which embodies the present invention.

As shown in FIG. 1 a radial flow fan wheel 74 is mounted on coolant pump 75 and driven by the engine 16 through a belt mechanism 77. A fan shroud 76 surrounds the fan wheel 74 and an air duct 78 is connected by a vibration dampening and sealing connection at 89 to the fan shroud 76, the duct directing cooling air through the oil cooler 80 and radiator 82 as shown in FIG. 3. The radiator 82 is independently mounted in the engine compartment 12 to form an operative portion of the vehicle but is not supported by the air duct 78. As shown the radiator 82 is supported on frame 11 by a crossmember 83 and is secured to crossmember 83 by machine screws 85. The oil cooler 80 also is supported by crossmember 83, such support occuring because the oil cooler is captured between a reentrant portion 83a along the front of crossmember 83 and machine screws 85 at the rear of crossmember 83. FIG. 5 illustrates the manner in which oil cooler 80 is assembled from the rear after subassembly 90 is put in place. The top of air duct 78 also is connected between reentrant portion 83a and machine screws 85, it being understood that air duct 78 is sufficiently flexible to allow movement between subassembly 90 and crossmember 83 when the engine is running.

The engine 16 and the pump mechanism 18 and the parts mounted on them, including the coolant pump 75, fan 74, fan shroud 76, alternator 51, belt drive mechanisms 68 and 77, and brackets 22, 29, 52 and 54 comprise a subassembly which is designated generally by the numeral 90. Such subassembly is preferably assembled separately and then installed in compartment 12 by making connections 26, 46, and 96. The pump mechanism 18 is mounted with the axis of input shaft 42 parallel to the axis of the output shaft 66 of the engine 16, and they are rigidly mounted within subassembly 90 which fixes the pump mechanism 18 and the space between the axis of the pump mechanism input shaft 42 and the axis of the engine output shaft 66 to maintain constant the pulley centers of the belt drive mechanism 68. The mounting of the fan 74 and shroud 76 as parts of subassembly 90 creates a single mass of increased size to provide lower vibration amplitude, and with the considerable spread on the mounting connections a stable operational configuration.

The transverse mounting arrangement of this invention permits selecting engine 16 and hydraulic pumps 18 individually for optimum performance, life and cost, without the necessity of having a common shaft speed as is required for engines and hydraulic pumps which are directly connected to each other; in this invention the pulleys 70 and 72 of belt drive mechanism 68 are selected to provide an optimum match between the engine and pumps.

While only a single embodiment of our invention has been described in detail as the best mode for carrying it out, it will be understood that the detailed description is intended to be illustrative only and that various modifications and changes may be made in our invention without departing from the spirit and scope of it; therefore, the limits of the invention are to be determined from the attached claims. Where reference is made in the claims and elsewhere to "oil cooler" it should be understood that such expression is intended to apply to a cooler for any hydraulic fluid.

We claim:

1. A mounting arrangement for the engine and pump mechanism of a hydrostatic drive vehicle which has two frame side members and a frame cross member extending between the two frame side members near one end of the vehicle comprising a longitudinally extending first bracket located adjacent one frame side member and connected thereto by a vibration dampening connection, one end of the engine and one end of the pump mechanism rigidly connected to said first bracket, the engine and the pump mechanism being located transversely of the frame, a second transverse bracket rigidly connected to the engine and connected by at least one vibration dampening connection to the frame cross member, a third engine-pump bracket rigidly connected to the engine adjacent the other end thereof and rigidly connected to the pump mechanism, and a fourth pump-frame bracket rigidly connected adjacent the other end of the pump mechanism and connected to the other frame side member by a vibration dampening connection.

2. A mounting arrangement as in claim 1 wherein said pump mechanism comprises two axially aligned pumps.

3. A mounting arrangement as in claim 1 wherein said engine includes a coolant pump.

4. A mounting arrangement as in claim 3 wherein a fan wheel is mounted on said coolant pump.

5. A mounting arrangement as in claim 4 wherein a shroud surrounds said fan wheel.

6. A mounting arrangement as in claim 5 wherein an air duct is connected to said shroud and arranged to direct air from said fan through an oil cooler and a radiator located in said vehicle above said engine and pump mechanism.

7. A subassembly for assembly into a vehicle having two frame side members and a frame cross member near one end of the side frame members, the subassembly comprising, a longitudinally extending first bracket arranged to be located in the vehicle adjacent one side frame member and to be connected to said side frame member by a vibration dampening connection near one extremity of the bracket, an engine arranged to be located transversely of the vehicle and having one end connected rigidly to said first bracket, a pump mechanism arranged to be located transversely of the vehicle and having one end connected rigidly to said first bracket, a second transverse bracket rigidly connected to said engine and arranged to be connected by at least one vibration dampening connection to the frame cross member, a third engine-pump bracket rigidly connected to said engine adjacent the other end thereof and rigidly connected to said pump mechanism, a fourth pump-frame bracket rigidly connected adjacent the other end of said pump mechanism and arranged to be connected to the other side frame member by a vibration dampening connection.

8. A subassembly as in claim 7 wherein said pump mechanism comprises two axially aligned pumps.

9. A subassembly as in claim 7 in which said engine includes a coolant pump.

10. A subassembly as in claim 9 wherein a fan wheel is mounted on said coolant pump.

11. A subassembly as in claim 10 wherein a shroud surrounds said fan wheel.

12. A subassembly as in claim 11 wherein means are provided for connecting to said shroud an air duct which is arranged to direct air from said fan to an oil cooler and a radiator located in the vehicle above the subassembly.

13. A subassembly as in claim 7 wherein an alternator is mounted on said first bracket as a part of the subassembly.

* * * * *